United States Patent
Lu

(10) Patent No.: US 8,392,812 B2
(45) Date of Patent: Mar. 5, 2013

(54) TELETEXT DECODER

(75) Inventor: Kuei-Ming Lu, Hsin Chu County (TW)

(73) Assignee: Sunplus Technology Co., Ltd., Hsin-Chu (TW)

( * ) Notice: Subject to any disclaimer, the term of this patent is extended or adjusted under 35 U.S.C. 154(b) by 238 days.

(21) Appl. No.: 12/833,395

(22) Filed: Jul. 9, 2010

(65) Prior Publication Data

US 2011/0013083 A1    Jan. 20, 2011

(30) Foreign Application Priority Data

Jul. 14, 2009   (TW) .............................. 98123673 A

(51) Int. Cl.
*H04L 1/00*   (2006.01)

(52) U.S. Cl. ......... 714/799; 714/800; 714/801; 714/802

(58) Field of Classification Search ........... 714/799–803
See application file for complete search history.

(56) References Cited

U.S. PATENT DOCUMENTS

| | | | | |
|---|---|---|---|---|
| 4,461,002 A * | 7/1984 | Nanko | ........................... | 714/798 |
| 4,561,100 A * | 12/1985 | Asao et al. | ..................... | 375/346 |
| 4,577,227 A * | 3/1986 | Gurumurthy | ................. | 348/464 |
| 4,593,374 A * | 6/1986 | Gurumurthy | .............. | 714/38.13 |
| 4,614,971 A * | 9/1986 | Maney et al. | ................. | 348/466 |
| 4,630,271 A * | 12/1986 | Yamada | ........................ | 714/760 |
| 4,794,626 A * | 12/1988 | Tanabe et al. | ................. | 375/368 |
| 4,819,231 A * | 4/1989 | Yamada | ........................ | 375/367 |
| 5,483,289 A * | 1/1996 | Urade et al. | .................. | 348/468 |
| 7,992,077 B2 * | 8/2011 | Chen et al. | ..................... | 714/819 |
| 2006/0244862 A1 * | 11/2006 | Yamashita | ..................... | 348/473 |
| 2009/0044087 A1 * | 2/2009 | Chen et al. | ..................... | 714/800 |

* cited by examiner

*Primary Examiner* — Pankaj Kumar
*Assistant Examiner* — Timothy Newlin
(74) *Attorney, Agent, or Firm* — Muncy, Geissler, Olds & Lowe, PLLC

(57) ABSTRACT

A teletext decoder is provided which is suitable for decoding a packet of teletext signal to generate a teletext. The teletext decoder includes an error judgment device for judging the accuracy of a plurality of sliced bits, and correcting an error occurrence bit in the sliced bits on the basis of a plurality of sampling points and a slicer level when the plurality of sliced bits are incorrect.

14 Claims, 5 Drawing Sheets

TELETEXT DECODER

BACKGROUND OF THE INVENTION (a) Field of the Invention

The invention relates to a teletext decoder, particularly to a teletext decoder having an automatic correction function.

(b) Description of the Related Art

According to ETS 300 706 enhanced teletext specification from ETSI, a teletext message can comprise various types of packets. FIG. 1 shows a schematic diagram illustrating the structure of a conventional packet. As shown in FIG. 1, the packet 900 comprises a clock run-in 911, a code area 910, and a data area 914. The code area 910 further comprises a teletext framing code 912 and other codes 913. Different kinds of packets 900 may contain different other codes 913 and a data area 914. The other codes 913 can be at least one of the following: magazine and packet number, page, sub-code, control bits, and designation code. The data area 914 can be characters, control codes, or information.

Generally, the packet 900 has 45 bytes, that is, there are 45 8-bit data, wherein the clock run-in 911 has 2 bytes and the teletext framing code 912 has one byte. As a television receives the waveform of a teletext signal, the average of the clock run-in 911 in the packet 900 is calculated as a slicer level for acquiring the digital data in the teletext signal. The television can use the teletext framing code 912 to distinguish whether or not the data from the data area 914 of the packet 900 is a teletext.

Various coding methods, such as odd parity check and Hamming Encode method, can be used to encode the packet 900 in order to ensure data accuracy. The code area 910 comprises less data quantity but is more important. Thus, generally 4 data bits and 4 Hamming protection bits are used to encode (Hamming 8/4 Encode). The data quantity of the data area 914 is larger and usually 7 data bits and one odd parity check bit are used to encode in order to increase the television performance and the data transmission quantity of the packet 900. The odd parity check method does not have any function of correcting an error occurrence bit. When there is any error in the 8-bit data encoded by the odd parity check method, since the odd parity check method does not have any function for correcting error occurrence bit and TV broadcast transmits uni-directionally from the transmitting end, the receiving end can only discard the data with error. In the prior art, when a page or a line with error is detected, the old data is used without update to let user see the screen without any incorrect text. For example, U.S. Pat. No. 4,614,971 disclosed a system for eliminating error in teletext signals. The system provides with a noise detector to determine whether or not the data in the packet temporarily stored in the memory is interfered by noise. When the noise detector detects a certain level of noise, the packet will be discarded and thus will not be input to the teletext decoder so that the probability of displaying the data with error in the packet on the screen is decreased.

BRIEF SUMMARY OF THE INVENTION

According to one embodiment of the invention, a teletext decoder suitable for decoding a packet of a teletext signal to thereby generate a teletext is provided. The teletext decoder comprises a sampling module, a slicer level calculator, and an error judgment device. The sampling module samples the packet according to a sampling clock signal to thereby generate a plurality of sampling points. The slicer level calculator acquires a slicer level according to the packet and then generates a plurality of sliced bits according to the sampling points and the slicer level. The error judgment device determines whether the sliced bits are correct and corrects an error occurrence bit in the sliced bits by the sampling points and the slicer level when the sliced bits are incorrect.

According to another embodiment of the invention, the error judgment device comprises an error corrector and an error comparator. The error corrector determines whether the sliced bits are correct by an odd parity check method and corrects the error occurrence bit in the sliced bits when the sliced bits are incorrect. The error comparator compares the sampling points with a first level and a second level and, when the first sampling point from the sampling points is between the first level and the second level, further sets a first sliced bit from the sliced bits corresponding to the first sampling point as the error occurrence bit.

According to another embodiment of the invention, the error judgment device comprises an error corrector and an error comparator. The error corrector determines whether the sliced bits are correct by an odd parity check method and corrects the error occurrence bit in the sliced bits when the sliced bits are incorrect. The error comparator compares the sampling points with the slicer level. When the difference between the first sampling point in the sampling points and the slicer level is minimum, further sets a first sliced bit from the sliced bits corresponding to the first sampling point as the error occurrence bit.

According to another embodiment of the invention, the teletext decoder further comprises an output device for fetching the sliced bits processed by the error judgment device and outputting the data of the teletext after the sliced bits of the packet are fetched.

According to the teletext decoder of one embodiment of the invention, since an error judgment device is provided, the error occurrence bit in the sliced bits can be found and corrected so that a relatively correct teletext can be displayed on a TV.

DETAILED DESCRIPTION OF THE INVENTION

Figure 1:
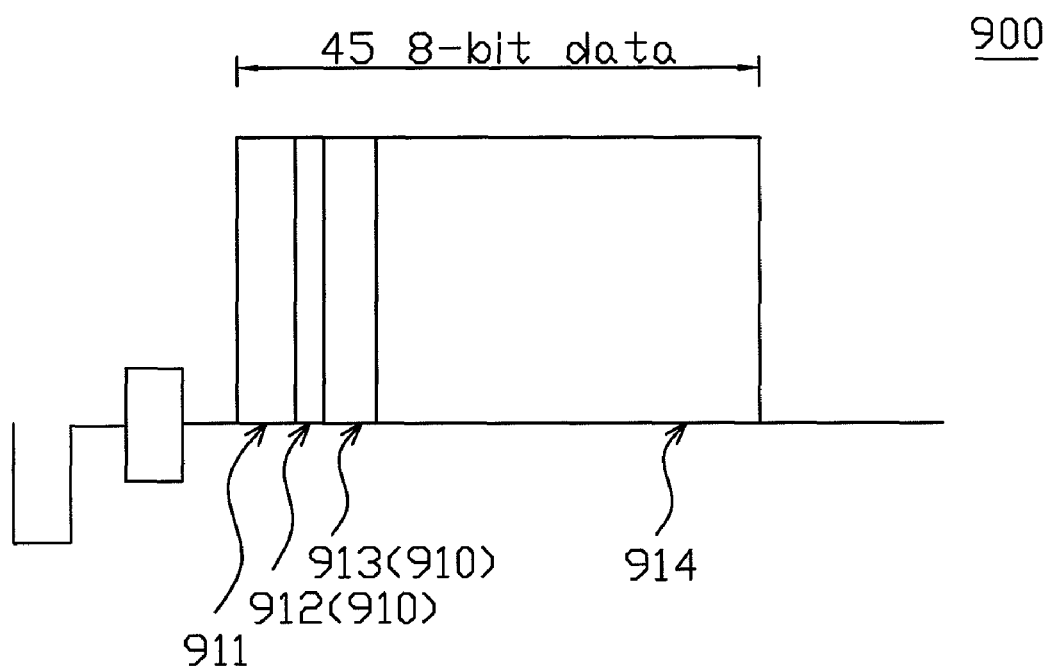
FIG. 1 shows a schematic diagram illustrating the structure of a packet according to the prior art.
Figure 2:
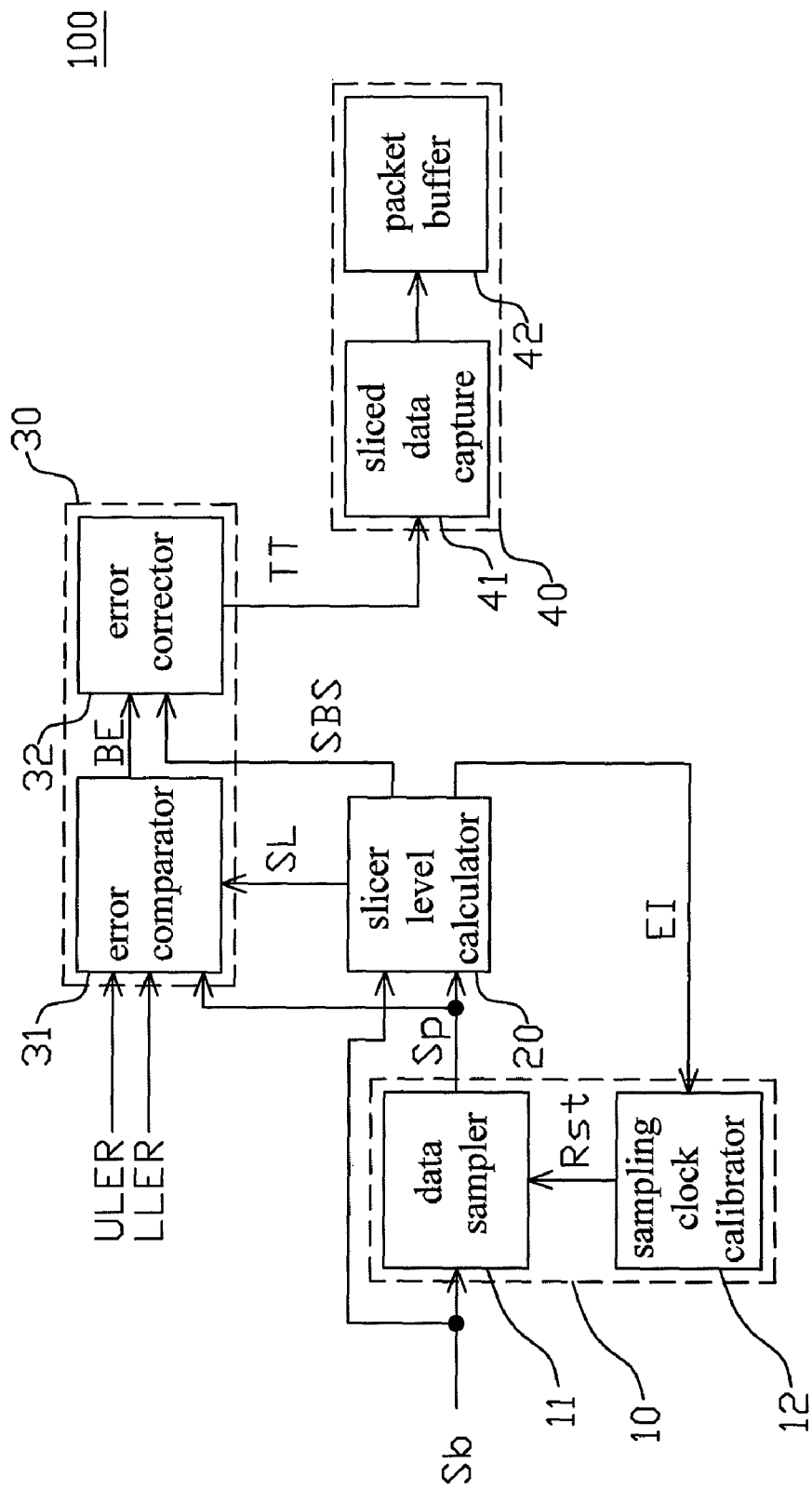
FIG. 2 shows a block diagram illustrating a teletext decoder according to one embodiment of the invention.

FIG. 2 shows a block diagram illustrating a teletext decoder according to one embodiment of the invention. The teletext decoder 100 is provided in a television set and suitable for receiving a teletext signal Sb comprising video data and teletext(s). The teletext decoder 100 comprises a sampling module 10, a slicer level calculator 20, an error judgment device 30, and an output device 40.

The sampling module 10 receives and samples the teletext signal Sb. The sampling module 10 comprises a data sampler 11 and a sampling clock calibrator 12. The data sampler 11 samples the packets pkt in the teletext signal Sb according to a sampling clock signal Rst to thereby produce a sampling point signal Sp. According to the sampling clock in the sampling clock signal Rst, the data sampler 11 acquires a plurality of sets of sampling points from each packet pkt in the teletext signal Sb. Each set of sampling points comprises 8 sampling points and the sampling points further form a sampling point signal Sp. The sampling clock calibrator 12 adjusts the sampling clock in the sampling clock signal Rst according to a clock error signal EI to increase the sampling accuracy.

Figure 3:
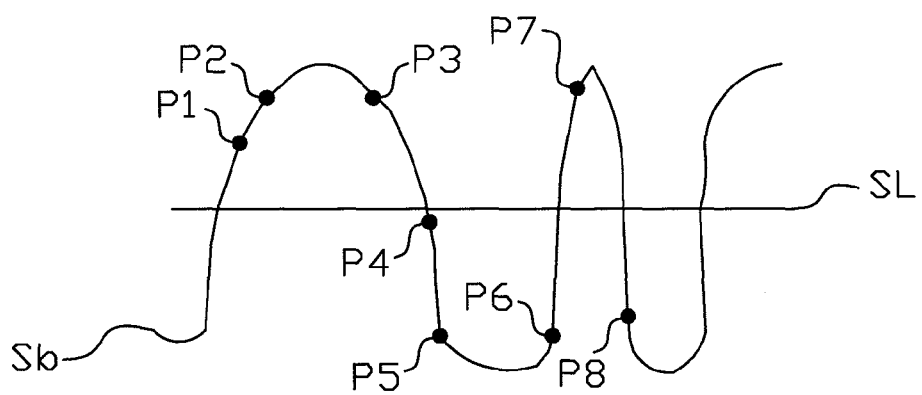
FIG. 3 shows a schematic diagram illustrating the relation between 8 sampling points and the slicer level according to one embodiment of the invention.

The slicer level calculator 20 acquires a slicer level SL according to the packet pkt from the teletext signal Sb and generates a sliced bit stream SBS according to the sampling points from the sampling point signal Sp and the slicer level SL, wherein the sliced bit stream SBS comprises a plurality of sliced bits. FIG. 3 shows the relation between 8 sampling points and the slicer level according to one embodiment of the invention. Referring to FIG. 3, the slicer level calculator 20 acquires the slicer level SL according to a clock run-in 911 from the packet pkt and compares each sampling point P1-P8 in the packet pkt with the slicer level SL. When the sampling point is larger than the slicer level SL, the slicer level calculator 20 sets the value of the sliced bit corresponding to the sampling point as logic 1. When the sampling point is smaller than the slicer level, the slicer level calculator 20 sets the value of the sliced bit corresponding to the sampling point as logic 0. Therefore, the logic values of the sliced bits corresponding to the sampling points P1-P8 separately are 11100010. The slicer level calculator 20 further calculates the error information between the actual value and the target value of the sampling points to form the clock error signal EI. Thus, the sampling clock calibrator 12 can adjust the sampling clock in the sampling clock signal Rst according to the clock error signal EI.

The error judgment device 30 judges whether or not the sliced bits of a set of sampling points corresponding to the packet pkt are correct. When the sliced bits are incorrect, the error judgment device 30 identifies and corrects an error occurrence bit in the sliced bits on the basis of the sampling points in the set of the sampling points and the slicer level SL.

In this embodiment, the error judgment device 30 comprises an error corrector 32 and an error comparator 31 and each set of sampling points of the packet pkt has 8 sampling points. As shown in the following Table 1, the data area 914 of the packet pkt uses 7 teletext data bits and one odd parity check bit for encoding so that the number of sliced bits with logic 1 is odd in each set of sampling points.

TABLE 1

| 7 data bits (the number of values with logic 1) | one odd parity check bit | Sampling point set |
|---|---|---|
| 0000000 (0) | 1 | 10000000 |
| 1010001 (3) | 0 | 01010001 |
| 1101001 (4) | 1 | 11101001 |
| 1111111 (7) | 0 | 01111111 |

The error corrector 32 uses an odd parity check method to judge whether or not the sliced bits are correct. For example, as shown in FIG. 3, the logic values of the sampling points P1-P8 are 11100010, wherein there are four values with logic 1 and the number of logic 1 is not an odd number. Thus, at least one sampling point in the sampling points P1-P8 is incorrect. When the odd parity check method is used to judge whether there is error in the sampling points P1-P8, an odd number of incorrect sampling points in the sampling points P1-P8 will be found.

Figure 4:
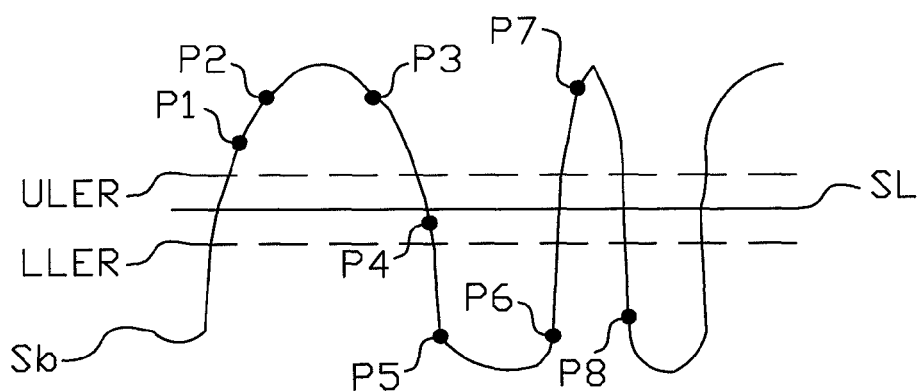
FIG. 4 shows a schematic diagram illustrating 8 sampling points, the slicer level, and the upper level of error range, and the lower level of error range according to one embodiment of the invention.

The error comparator 31 generates a bit error signal BE according to the sampling point signal Sp and the slicer level SL, and then the error corrector 32 can correct the sliced bit stream SBS according to the bit error signal BE. In this embodiment, the error comparator 31 receives an upper level of error range ULER and a lower level of error range LLER and compares the sampling points P1-P8 with the upper level of error range ULER and the lower level of error range LLER. When the first sampling point in the sampling points is between the upper level of error range ULER and the lower level of error range LLER, the error comparator 31 determines that a first sliced bit corresponding to the first sampling point in the sliced bits is the error occurrence bit. For illustration convenience, "the first sampling point" in this specification is used to differentiate from the other sampling points in the sampling points and "the first sliced bit" is also used to differentiate from the other sliced bits in the sliced bits. FIG. 4 shows a schematic diagram illustrating 8 sampling points, the slicer level, and the upper level of error range, and the lower level of error range according to one embodiment of the invention. The following will further describe one embodiment of the invention. Referring to FIG. 4 and following table 2, the logic values of the sampling points P1-P8 outputted by the slicer level calculator 20 are 11100010. The error comparator 31 finds out that the fourth sliced bit in the sliced bits is an error occurrence bit. The error comparator 31 sets the bit error flag of the fourth sliced bit to logic 1 and the others to logic 0, and then generates a bit error signal BE to label the error occurrence bit. The error corrector 32 can perform parity check on the bit error signal BE and the sliced bits, and then correct the logic 0 of the fourth sliced bit to logic 1 to form a teletext signal TT. The data of the teletext TT is the corrected sliced bit.

TABLE 2

| Sampling point | P1 | P2 | P3 | P4 | P5 | P6 | P7 | P8 |
|---|---|---|---|---|---|---|---|---|
| Bit error signal BE | 0 | 0 | 0 | 1 | 0 | 0 | 0 | 0 |
| Sliced bit | 1 | 1 | 1 | 0 | 0 | 0 | 1 | 0 |
| Corrected sliced bit | 1 | 1 | 1 | 1 | 0 | 0 | 1 | 0 |

Figure 5:
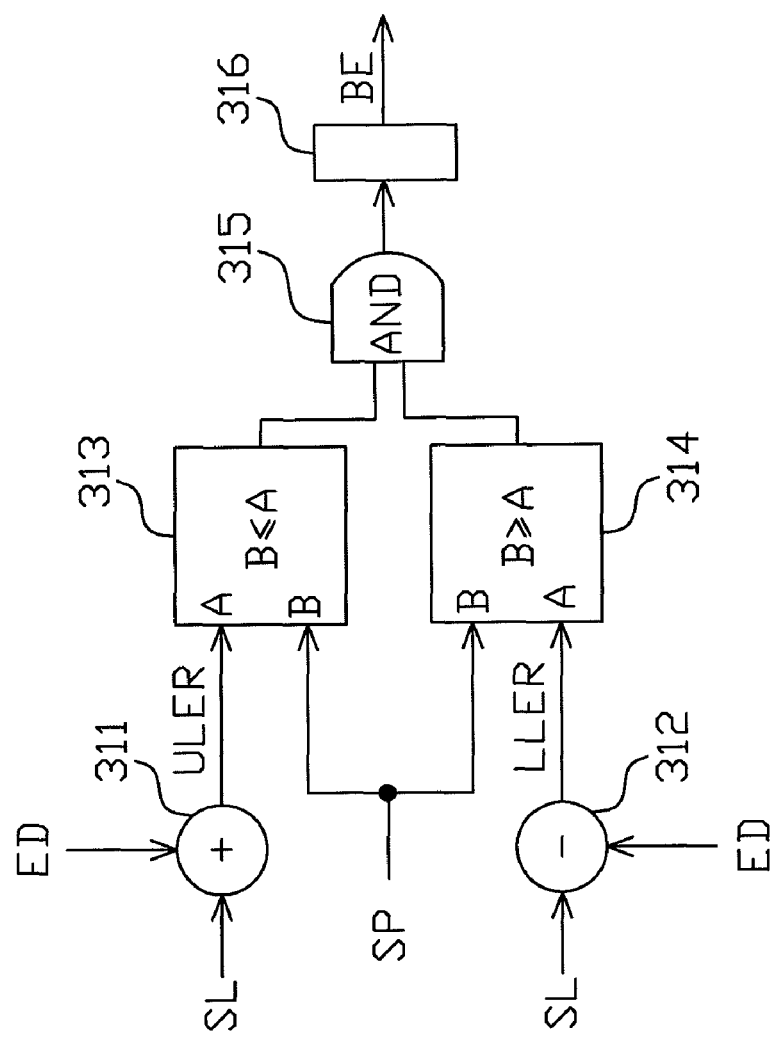
FIG. 5 shows a block diagram illustrating an error comparator according to one embodiment of the invention.

FIG. 5 shows a block diagram illustrating an error comparator according to the invention. The error comparator 31 comprises a first comparator 313, a second comparator 314, a AND gate 315, and a flip flop 316. The first comparator 313 compares the upper level of error range ULER and the sampling points of the sampling point signal Sp. When the sampling points of the sampling point signal Sp is less than or equal to the upper level of error range ULER, the first comparator 313 outputs a signal. The second comparator 314 compares the lower level of error range LLER and the sampling points of the sampling point signal Sp. When the sampling points of the sampling point signal Sp is larger than or equal to the lower level of error range LLER, the second comparator 314 outputs a signal. When the AND gate 315 simultaneously receives the output signals from the first comparator 313 and the second comparator 314, the AND gate 315 outputs an output signal. The output signal of the AND gate 315 passes the flip flop 316 to form the bit error signal BE. Besides, the error comparator 31 can further comprise an adder 311 and a subtracter 312. The adder 311 is used to form the upper level of error range ULER by the addition of an error deviation ED to the slicer level SL. The subtracter 312 subtracts the error deviation ED from the slicer level SL to form the lower level of error range LLER. The upper level of error range ULER and the lower level of error range LLER or the error deviation ED can be obtained from a signal attenuation test. That is, by having the intensity of the teletext signal Sb gradually decreased until the sliced bit acquired by the slicer level calculator 20 has error, the upper level of error range ULER and the lower level of error range LLER or the error deviation ED can be obtained according to the intensity of the teletext signal Sb at the time the error occurs. Therefore, according to setting relating to the environment, the teletext decoder 100 can be adapted to various environments.

Figure 6:
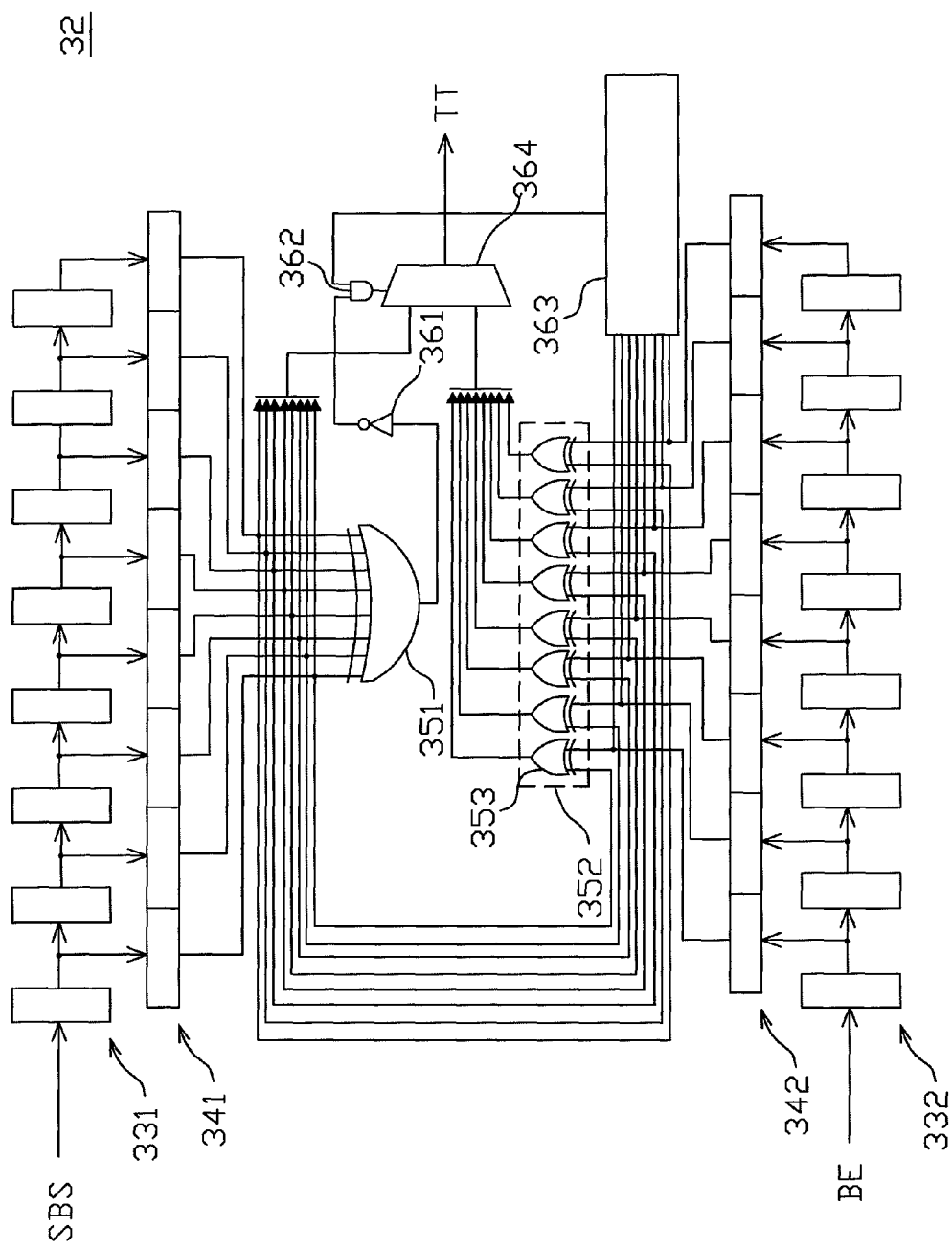
FIG. 6 shows a block diagram illustrating an error corrector according to one embodiment of the invention.

FIG. 6 shows a block diagram illustrating an error corrector according to one embodiment of the invention. In the error corrector 32, the serial-in shifter 331 receives the sliced bit stream SBS in series and outputs 8 bits of data to the parallel-out register 341. The exclusive-OR gate device 351 receives the 8-bit data outputted by the parallel-out register 341 and generates an output signal when determining that the number of values with logic 1 in the 8-bit data is odd. The output signal of the exclusive-OR gate device 351 passes the NOT gate 361 and then is received by the AND gate 362. In one embodiment, the exclusive-OR gate device 351 can comprise a plurality of exclusive-OR gates. The serial-in shifter 332 receives the serial bit error signal BE and outputs 8 bits of data to the parallel-out register 342. The exclusive-OR gate device 352 comprises 8 exclusive-OR gates 353. Each exclusive-OR gate 353 is respectively coupled to two corresponding 1-bit registers of the parallel-out registers 341 and 342. When the exclusive-OR gate 353 receives one of the output signals from the two corresponding 1-bit registers of the parallel-out registers 341 and 342, the exclusive-OR gate 353 generates an output signal. For example, referring to Table 2, in the case of the sampling points P1, P2, P3, and P7, the output signals are generated. The 1-bit asserted detector 363 receives the 8-bit data outputted by the parallel-out register 342 and generates an output signal after detecting that the 8-bit data belongs to which of the following cases: 10000000, 01000000, 00100000, 00010000, 00001000, 00000100, 00000010, and 00000001. When the AND gate 362 simultaneously receives the output signals from the exclusive-OR gate device 351 and the 1-bit asserted detector 363, the AND gate 362 outputs an output signal as the control signal of the multiplexer 364. The first input terminal of the multiplexer 364 separately receives the bit data of the parallel-out register 341 and the second input terminal of the multiplexer 364 separately receives the output signals of the exclusive-OR gates 353. According to the output signal of the AND gate 362, the multiplexer 364 optionally outputs the signal inputted from the first input terminal or the second input terminal. Thus, the error occurrence bit in the sliced bits can be corrected and the teletext signal TT can be formed wherein the data of the teletext signal TT is the corrected sliced bits.

Besides, according to the report from U.S. Pat. No. 4,819, 231, in 8 bits of data with error, the probability of having only one error bit is as high as 85%. Thus, in one embodiment of the invention, when the error comparator 31 compares the sampling points P1-P8 with the slicer level SL and detects that the difference between the sampling point P4 and the slicer level SL, compared to the other sampling points, is minimum, the fourth sliced bit can be determined to be the error occurrence bit. According to this embodiment, with the input of the upper level of error range ULER and the lower level of error range LLER, the error occurrence bit in the sliced bits can be found.

The output device 40 fetches the sliced bits of the teletext signal TT and outputs the data of the teletext. Specifically, the output device 40 fetches the sliced bits processed by the error judgment device 30. After the sampling module 10 completely processes the whole packet pkt and the output device 40 fetches all the sliced bits corresponding to the packet pkt, the output device 40 outputs the data of the teletext. The output device 40 comprises a sliced data capture 41 and a packet buffer 42. The sliced data capture 41 fetches the sliced bits processed by the error judgment device 30 and serially converts the sliced bits processed by the error judgment device 30 into an 8-bit parallel-out bit stream. The packet buffer 42 stores each 8-bit data and outputs the data of the teletext for displaying on a TV after all the sliced bits corresponding to the packet pkt are fetched.

According to the teletext decoder of the invention, the error judgment device is used to correct the error occurrence bit from the sliced bits so that teletexts can be displayed on a TV correctly.

What is claimed is:

1. A teletext decoder, for decoding a packet from a teletext signal to generate a teletext, comprising:
    a sampling module, for sampling the packet according to a sampling clock signal to thereby generate a plurality of sampling points;
    a slicer level calculator, for acquiring a slicer level according to the packet and generating a plurality of sliced bits according to the sampling points and the slicer level; and
    an error judgment device, comprising:
        an error comparator, for comparing the sampling points with a upper level of error range and a lower level of error range, when the first sampling point from the sampling points is between the upper level of error range and the lower level of error range, setting a first sliced bit from the sliced bits corresponding to the first sampling point as an error occurrence bit; and
        an error corrector, for determining whether the sliced bits are correct and correcting the error occurrence bit in the sliced bits when the sliced bits are incorrect.

2. The teletext decoder according to claim 1, wherein the error corrector determines whether the sliced bits are correct by an odd parity check.

3. The teletext decoder according to claim 2, wherein the error comparator generates a bit error signal according to the first sampling point and the error corrector corrects the error occurrence bit in the sliced bits according to the bit error signal.

4. The teletext decoder according to claim 2, wherein the slicer level is between the upper level of error range and the lower level of error range.

5. The teletext decoder according to claim 2, wherein the number of the sampling points and the sliced bits in the packet is 8 bits, where one bit is used as an odd parity check bit and the other bits are used as the data of the teletext.

6. The teletext decoder according to claim 5, further comprising:
    an output device, for fetching the sliced bits processed by the error judgment device and outputting the data of the teletext after the sliced bits of the packet are fetched.

7. The teletext decoder according to claim 1, wherein the sampling module comprises:
    a data sampler, for sampling the packet according to the sampling clock in the sampling clock signal; and
    a sampling clock calibrator, for adjusting the sampling clock according to a clock error signal.

8. The teletext decoder according to claim 7, wherein the slicer level calculator determines the error information between an actual value and a target value from the sampling points to generate the clock error signal.

9. The teletext decoder according to claim 1, wherein the slicer level calculator acquires the slicer level according to a clock run-in in the packet.

10. The teletext decoder according to claim 1, wherein the slicer level calculator compares the sampling points from the packet with the slicer level and sets the value of the sliced bit corresponding to the sampling point as a first logic value when the sampling point is larger than the slicer level, otherwise sets the value of the sliced bit corresponding to the sampling point as a second logic value when the sampling point is smaller than the slicer level.

11. The teletext decoder according to claim 1, wherein the upper level of error range and the lower level of error range is obtained according to the intensity of the teletext signal at the time an error occurs.

12. A teletext decoder, for decoding a packet from a teletext signal to generate a teletext, comprising:
  a sampling module, for sampling the packet according to a sampling clock signal to thereby generate a plurality of sampling points;
  a slicer level calculator, for acquiring a slicer level according to the packet and generating a plurality of sliced bits according to the sampling points and the slicer level; and
  an error judgment device, comprising:
    an error comparator, for comparing the sampling points with the slicer level, wherein when the difference between the first sampling point in the sampling points and the slicer level is minimum, setting a first sliced bit from the sliced bits corresponding to the first sampling point as an error occurrence bit; and
    an error corrector, for determining whether the sliced bits are correct and correcting the error occurrence bit in the sliced bits when the sliced bits are incorrect.

13. The teletext decoder according to claim 12, wherein the number of sampling points and the sliced bits in the packet is 8 bits, where one bit is used as an odd parity check bit and the other bits are used as the data of the teletext, and the error corrector determines whether the sliced bits are correct by an odd parity check.

14. The teletext decoder according to claim 13, further comprising:
  an output device, for fetching the sliced bits processed by the error judgment device and outputting the data of the teletext after the sliced bits of the packet are fetched.

* * * * *